United States Patent

Shikatani et al.

[11] Patent Number: 5,116,708
[45] Date of Patent: May 26, 1992

[54] HOLE TRANSPORTING MATERIAL

[75] Inventors: Yutaka Shikatani; Naoki Kataoka, both of Kawasaki; Nobuyuki Kuroda, Yokohama; Kazuo Matsuura, Tokyo, all of Japan

[73] Assignee: Nippon Oil Company, Limited, Tokyo, Japan

[21] Appl. No.: 447,649

[22] Filed: Dec. 8, 1989

[30] Foreign Application Priority Data

Dec. 9, 1988 [JP] Japan .................. 63-309940
Aug. 31, 1989 [JP] Japan .................. 1-222840

[51] Int. Cl.$^5$ .............................. G03G 5/087
[52] U.S. Cl. ............................ 430/59; 564/309
[58] Field of Search ............ 430/56, 59, 66, 69; 564/309

[56] References Cited

U.S. PATENT DOCUMENTS 4,806,444 2/1989 Yanus et al. ................ 430/59
4,818,650 4/1989 Limburg et al. ............. 430/59

OTHER PUBLICATIONS

Tang et al. *App. Phys. Letter 51* 913–915 (1987).

Primary Examiner—John Goodrow
Attorney, Agent, or Firm—Scully, Scott, Murphy & Presser

[57] ABSTRACT

A hole transporting material is constituted by a compound represented by the following general formula (1):

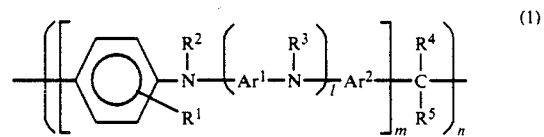

wherein $R^1$, $R^2$, $R^3$, $R^4$ and $R^5$, which may be the same or different, are each independently hydrogen or a hydrocarbon residue having 1 to 20 carbon atoms; $Ar^1$ and $Ar^2$ are each independently a divalent hydrocarbon residue; $l$ is an integer of 0 or more; $m$ is an integer of 1 or more; and $n$ is an integer of 2 or more.

8 Claims, 2 Drawing Sheets

HOLE TRANSPORTING MATERIAL

BACKGROUND OF THE INVENTION

The present invention relates to a novel hole transporting material.

With development of the electronics field there is a demand for a material capable of efficiently transporting either electrons or holes in fabricating various electronics devices.

Hole transporting materials which carry only holes in high efficiency are now in wide use as photoreceptor in electrophotography, and their application to organic electroluminescent devices is expected.

For example, an organic photoconductor (hereinafter referred to simply as "OPC") has recently attracted attention of many concerns in quick tempo as an organic photoreceptor mainly in its application to electrophotography. When used as a photoreceptor, OPC plays the role as a carrier transporting material.

OPC possesses various features, such as advantage in processability, easy to constitute a device, good electric charge accepting and holding properties, and advantage in cost. Therefore, researches are being made energetically not only about using OPC as a substitute for photoreceptor using inorganic materials but also about the development of a organic photoreceptor of OPC having a new performance.

Heretofore, various organic photoconductive compounds have been known as OPC's. Typical examples include various low molecular weight organic compounds such as triphenylamine derivatives, pyrazoline derivatives, oxadiazole derivatives, indoline derivatives and carbazole derivatives. These various OPC's per se are low molecular compounds, so unmoldable, and a large area which is required for a photoreceptor cannot be attained by the use of them. For example, therefore, such OPC's are mixed and dispersed in a transparent high polymer such as polycarbonate as a matrix polymer to prepare OPC photoreceptor.

Therefore, a restriction is placed on the OPC content in the matrix polymer. At a high OPC concentration, a uniform dispersibility of OPC in the matrix is deteriorated, so it has been difficult to use OPC at a high concentration. For this reason, a limit is also reached in the carrier transporting ability in a OPC photoreceptor, that is, it is impossible to attain a high carrier mobility. Under the circumstances it has been desired to develop an OPC having superior photoconductivity.

An electroluminescent device (ELD) has long been noted as a thin large-area light source. With the recent spread and reduction in size and weight of office automation (OA) devices, a liquid crystal display has come to be widely adopted as a display device, and now there is an increasing expectation for ELD as a back light for the liquid crystal display.

ELD, which is a thin, flat shape light emitting device of a light weight, possesses such features as no flicker on the screen, a wide visual angle and a low power consumption. However, since the ELD which has heretofore been put to practical use is operated by a light emitting mechanism called a collision excitation type, it is necessary to use a high driving AC voltage of 200 volts or so; besides, the light emission efficiency is low and the luminescence is also low.

C.W. Tang et al. [Appl. Phys. Lett. 51(12), 913 (1987)] manufactured for trial an organic thin film ELD of an injection type different from the conventional light emitting mechanism, and showed that the drawbacks of the conventional AC voltage driven, collision excitation type ELD. An injection type ELD is basically of a sandwich structure wherein a light emitting layer is sandwiched in between an electron injection electrode and a hole injection electrode. But, according to the ELD developed by C.W. Tang et al., an arylamine-based organic hole transporting layer is formed by vapor deposition between the light emitting layer and the hole injection electrode, and as the electron injection electrode there is used a metal having a small work function such as, for example, magnesium, whereby they showed that the ELD could be driven at a low DC voltage of several ten volts or so and that a high luminance light emission comparable to that of a light emitting diode could be attained. It is apparent that an important component for fabricating a low DC voltage driven, organic thin film ELD of high luminance is an organic hole transporting layer. In order to obtain an ELD of a practical level and a higher performance it is desired to obtain a hole transporting material which can be easily made uniform and small in film thickness. Particularly, for fabricating an ELD of a large area on an industrial scale it is necessary to form a thin hole transporting film having a uniform thickness, free of defects such as pin-holes and high in reliability. But it cannot be said that the conventional means such as vapor deposition satisfy those requirements.

Thus, the conventional hole transporting materials involve various problems.

It is an object of the present invention to solve the above-mentioned problems of the prior art.

It is another object of the present invention to provide a novel hole transporting material having extremely superior hole transporting ability and processability, that is, capable of overcoming all of the problems of the conventional OPC's and hole moving materials typified by hole transporting materials for ELD.

SUMMARY OF THE INVENTION

In one aspect the present invention resides in a hole carrying material constituted by a compound of the following general formula (1):

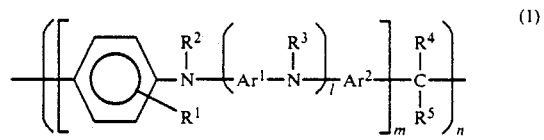

wherein $R^1$, $R^2$, $R^3$, $R^4$ and $R^5$, which may be the same or different, are each hydrogen or a hydrocarbon residue having 1 to 20 carbon atoms; $Ar^1$ and $Ar^2$ are each a divalent aromatic hydrocarbon residue; $\lambda$ is an integer of 0 or more; m is an integer of 1 or more; and n is an integer of 2 or more.

In another aspect the present invention resides in a photoconductor constituted by a compound of the following general formula (1):

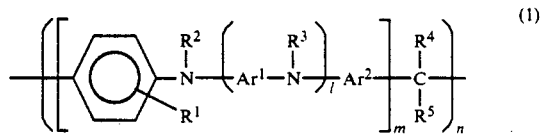

wherein $R^1$, $R^2$, $R^3$, $R^4$ and $R^5$, which may be the same or different, are each hydrogen or a hydrocarbon residue having 1 to 20 carbon atoms; $Ar^1$ and $Ar^2$ are each a divalent aromatic hydrocarbon residue; $\lambda$ is an integer of 0 or more; m is an integer of 1 or more; and n is an integer of 2 or more.

In a further aspect the present invention resides in a hole transporting material for an electroluminescent device constituted by a compound of the following general formula (1):

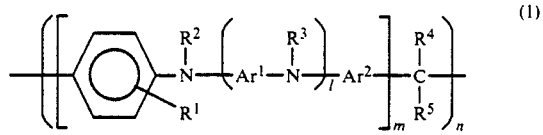

wherein $R^1$, $R^2$, $R^3$, $R^4$ and $R^5$, which may be the same or different, are each hydrogen or a hydrocarbon residue having 1 to 20 carbon atoms; and $Ar^1$ and $Ar^2$ are each a divalent aromatic hydrocarbon residue; $\lambda$ is an integer of 0 or more; m is an integer of 1 or more; n is an integer of 2 or more.

DETAILED DESCRIPTION OF THE INVENTION

The present invention will be described in detail hereinunder.

The "hole transporting material" as referred to herein indicates a material capable of mainly holes alone. The hole transporting material of the present invention is characterized by being represented by the general formula (1).

In the compounds of the general formula (1), $R^1$, $R^2$, $R^3$, $R^4$ and $R^5$ are each independently hydrogen or a hydrocarbon residue having 1 to 20, preferably 1 to 12, carbon atoms. The substituents $R^1$ to $R^5$ may be the same as or different from one another. Preferred examples of $R^1$, $R^2$ and $R^3$ are hydrogen and hydrocarbon residues such as alkyl groups, preferably alkyl groups having 1 to 8 carbon atoms, e.g. methyl, ethyl, n-proply, i-propyl, n-butyl, i-butyl and n-hexyl, alkoxyphenyl groups, e.g. methoxyphenyl and ethoxyphenyl, alkylphenyl groups, e.g. tolyl and ethylphenyl, aryl groups, preferably aryl groups having 6 to 10 carbon atoms, e.g. phenyl, aralkyl groups, and derivatives thereof. Preferred examples of $R^4$ and $R^5$ are hydrogen and hydrocarbon residues such as alkyl groups, e.g. methyl, ethyl, n-propyl, i-propyl, n-butyl, i-butyl and n-hexyl, alkoxyphenyl groups, e.g. methoxyphenyl and ethoxyphenyl, alkylphenyl groups, e.g. tolyl and ethylphenyl, aryl groups, e.g. phenyl, chlorophenyl and nitrophenyl, aralkyl groups, and derivatives thereof, furyl, and pyridyl.

$Ar^1$ and $Ar^2$ in the compounds of the general formula (1) each represent a divalent aromatic hydrocarbon residue, and both may be the same or different. Examples of $Ar^1$ are functional groups represented by the following general formulae (2), (3) and (4):

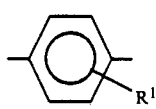

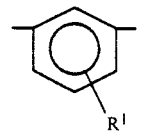

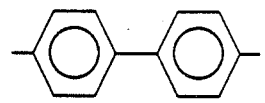

wherein $R^1$ is the same as in the general formula (1). Preferred examples are phenylene groups such as p-phenylene, m-phenylene, p-biphenylene, methyl-p-phenylene, ethyl-p-phenylene, methoxy-p-phenylene, methyl-m-phenylene, ethylm-phenylene, methoxy-m-phenylene, and derivatives thereof.

Preferred examples of $Ar^2$ are, in addition to the above phenylene groups of the general formulae (2), (3), (4) and derivatives thereof, divalent monocyclic or condensed polycyclic aromatic hydrocarbon residues such as 1,5- or 2,7-naphthylene, 1,4-, 1,5- or 2,6-anthraquinonylene, and benzanthronylene, as well as divalent hereto atomcontaining condensed heterocyclic aromatic hydrocarbon residues, for example, divalent heterocyclic groups such as 2-phenylbenzoxazolediyl, 2-phenylbenzimidazoleyl, carbazolediyl, 2-phenylbenzothiazolediyl, 2-phenylbenzotriazolediyl, dibenzothiophenediyl, dibenzothiophenoxidediyl, 9-acridonediyl, xanthonediyl, and phenoxazinediyl. $\lambda$ is an integer of 0 or more, usually 0 to 50, preferably 0 to 10, more preferably 0 to 5, most preferably 1 to 5; m is an integer of 1 or more, usually 1 to 50, preferably 1 to 30 more preferable 1 to 10; and n is an integer of 2 or more, usually 2 to 1000, preferably 5 to 500, more preferably 20 to 200, The compounds in question substantially have a linear structure. When $\lambda=0$ and $m=1$, n is usually larger than 20, preferably 30 to 1000, more preferably 40 to 200, in order to further enhance the effect of the present invention. Both ends of the formula (1) are not specially limited, but are usually nuclear-substituted hydrogens.

The compounds of the general formula (1) are usually prepared by polycondensation of compounds of the following general formula (5) and compounds of the following general formula (6) or polymers thereof. But how to prepare them is not limited at all:

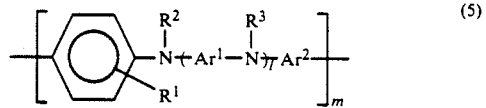

wherein $R^1$, $R^2$, $R^3$, $R^4$, $R^5$, $Ar^1$, $Ar^2$, $\lambda$ and m are the same as in the general formula (1).

Examples of the compounds represented by the general formula (5) include N,N'-diphenyl-p-phenylenediamine compounds and N-phenyl-N'-(4-phenylamino)-phenyl-p-phenylenediamine compounds.

Among the compounds of the general formula (5), those wherein m is 2 or more are usually prepared by subjecting compounds of the same general formula wherein m is 1 to an oxidative coupling reaction using an oxidizing agent such as a manganese compound or ferric salt or to an electrolytic oxidative polymerization.

For example, in the case of an N,N'-diphenyl-p-phenylenediamine compound as a compound of the general formula (5) wherein m≦2, it can be prepared by an oxidative coupling reaction of N,N'-diphenyl-p-phenylenediamine in a solvent such as ethanol, acetone, acetonitrile, ether, or benzene, using ferric chloride as a catalyst. In this case, the reaction can be carried out at a temperature in the range of from −50° C. to 100° C., preferably from −20° C. up to the boiling point of the solvent used, for 10 minutes to 100 hours, preferably 1 to 50 hours.

As typical examples of such N,N'-diphenyl-p-phenylenediamine compounds there are mentioned N,N'-dimethyl-N,N'-diphenyl-p-phenylenediamine, N,N'-diethyl-N,N'-diphenylp-phenylenediamine, and N,N'-dipropyl-N,N'-diphenyl-p-phenylenediamine.

Other compounds of the general formula (5) than the N,N'-diphenyl-p-phenylenediamine compounds are also prepared by a conventional method, for example, by a method in which aromatic amines and aromatic hydroxy compounds are reacted in an organic solvent in the presence of a transition metal catalyst or by a method in which phthalic acid ester is used as a starting material. More concrete contents of these methods are described in Japanese Patent Laid Open No. 38311/1980 and Journal of Polymer Science, Part C, 22, p.451 (1968).

As examples of compounds represented by the general formula (6) there are mentioned carbonyl compounds such as aldehydes, polymers of aldehydes and ketones.

Typical examples of aldehydes include formaldehyde, acetaldehyde, propionaldehyde, butyladehyde, benzaldehyde, acrylaldehyde, cinnamaldehyde, anisaldehyde, nicotinic aldehyde, nitrobenzaldehyde, chlorobenzaldehyde, and furfural.

The polymers of aldehydes represent polymers which are obtained by self condensation of aldehydes of the general formula (6) in the form of concentrated solutions or by condensation thereof in the presence of an acid catalyst and which hydrolyze easily under the reaction conditions for preparing the copolymer of the invention and form aldehyde monomers. Typical examples of such aldehyde polymers include paraformaldehyde which is a polymer of formaldehyde and paraldehyde which is trimer of acetaldehyde.

As examples of ketones there are mentioned acetone, ethyl methyl ketone, diethyl ketone, and cyclohexylacetone.

The polycondensation of a compound of the general formula (5) and a compound of the general formula (6) can be performed in an organic solvent in which both are soluble, at a temperature of 0° to 200° C., using an acid or alkali catalyst. As examples of acid catalysts there are mentioned inorganic acids such as sulfuric acid, hydrochloric acid, phosphoric acid, perchloric acid and diphosphorus pentoxide, as well as organic acids such as formic acid, acetic acid, propionic acid, methanesulfonic acid and p-toluenesulfonic acid. These acids may be used each alone or in combination of two or more. Preferred examples of organic solvents include ethers such as ethyl ether, tetrahydrofuran and dioxane, halogenated hydrocarbons such as chloroform, dichloromethane and chlorobenzene, nitro compounds such as nitrobenzene, as well as acetonitrile, propylene carbonate, dimethylformamide, and N-methylpyrrolidone. A suitable reaction time can be selected in the range of 1 minute to 500 hours, preferably 5 minutes to 200 hours.

The compound of the general formula (1) thus prepared in the present invention is a thermoplastic resin which is solvent-soluble, can be melted by heating, is superior in processability and can afford various moldings of desired shapes and that having a high mechanical strength. The compound in question further possesses a high hole transporting ability. Therefore, a hole transporting material using this compound is per se superior in moldability, thus permitting the formation of a thin film having a uniform thickness of a submicron order. Further, since a matrix polymer is not needed, the said hole transporting material has a high hole mobility as compared with conventional hole transporting materials of this sort. The hole transporting material of the present invention is applicable to various uses. For example, it is suitable as a photoconductor typified by an organic photoreceptor in electrophotography or as a hole transporting material for ELD. It per se can afford a large area and exhibits a high hole transporting ability.

EXAMPLES

The present invention will be described below more concretely in terms of working examples thereof, but the invention is not limited thereto.

EXAMPLE 1

1.00 g of N,N'-dimethyl-N,N'-diphenyl-p-phenylenediamine was placed in a three-necked 100 ml flask which had been purged with nitrogen, then 15 ml of nitrobenzene and 6 ml of acetic acid were added and dissolved therein. Thereafter, 120 μl of sulfuric acid and 250 μl of propionaldehyde were added and reaction was allowed to take place at 50° C. for 140 hours under stirring. The reaction solution was poured into 300 ml of ethanol containing 30 ml of NaOH and the resulting precipitate of reddish brown was filtered off, then washed with ethanol and distilled water, followed by drying to afford 0.85 g of a reddish brown powder. The powder was determined for $^1$H-NMR, $^{13}$C-NMR and IR (FIG. 1) spectra; as a result, it proved to have the following structure:

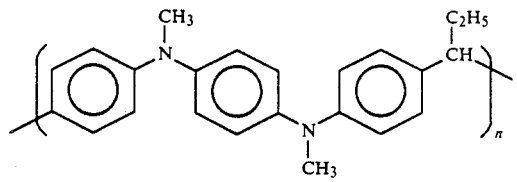

$^1$H-NMR($C_5D_6$) : (ppm) 6.82–7.20 (m), 3.65 (m), 2.97 (m), 2.02 (m), 0.92 (t)

$^{13}$C-NMR($CDCl_3$) : (ppm) 147.4, 143.7, 137.4, 128.4, 122.6, 118.6, 51.8, 40.4, 28.9, 12.9

The polymer thus obtained was dissolved in chloroform, and using the resulting solution, a polymer film was formed on a copper plate according to a casting method. With respect to the polymer film thus formed, a charge carrier mobility was determined according to a time-of-flight method (TOF method); as a result, a hole mobility of $10^{-6}$ cm$^2$/V.sec was observed.

EXAMPLE 2

Reaction was performed in the same way as in Example 1 except that 1.5 g of N,N'-ditolyl-N,N'-diphenyl-p- phenylenediamine was used in place of N,N'-dimethyl-N,N'-diphenyl-p-phenylenediamine, to afford 1.1 g of a light grayish white powder. With respect to the this powder, a charge carrier mobility was determined by the TOF method in the same manner as in Example 1, which was found to be $10^{-4}$ cm$^2$/V.sec.

EXAMPLE 3

2.5 g of N-tolyldiphenyl amine was placed in a three-necked 100 ml flask which had been purged with nitrogen, then 20 ml of nitrobenzene was added and dissolved therein. Thereafter, 40 mg of p-toluenesulfonic acid and 0.6 ml of paraldehyde were added and reaction was allowed to take place at 80° C. for 4 hours. The reaction solution was poured into 300 ml of ethanol and the resulting precipitate of grayish white was filtered off, washed with ethanol and distilled water, then reprecipitated in a chloroform-ethanol system for purification, followed by drying to afford 2.6 g of a white powder. As a result of GPC determination the powder thus obtained was found to be a high polymer having an elution curve peak-top molecular weight of about 9,000 (degree of polymerization: about 31). Further, this polymer was determined for $^1$H-NMR, $^{13}$C-NMR (FIG. 2) and IR spectra; as a result, it proved to have the following structure:

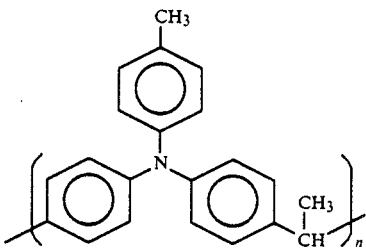

Also, a charge carrier mobility was determined in the same manner in Example 1; as a result, a hole mobility of $10^{-4}$ cm$^2$/V.sec was observed.

EXAMPLE 4

Reaction was performed in the same way as in Example 3 except that the reaction time was changed from 4 to 8 hours, to afford 2.6 g of a white powder. As a result of GPC determination the powder thus obtained was found to have an elution curve peak-top molecular weight of about 33,000 and a polymerization degree of about 100. Further, a charge carrier mobility was determined in the same manner as in Example 1, which was found to be $10^{-4}$ cm$^2$/V.sec.

As set forth hereinabove, the photoconductor according to the present invention per se is moldable and affords moldings superior in mechanical strength. Besides, it possesses a high hole carrying ability.

Figure 1:
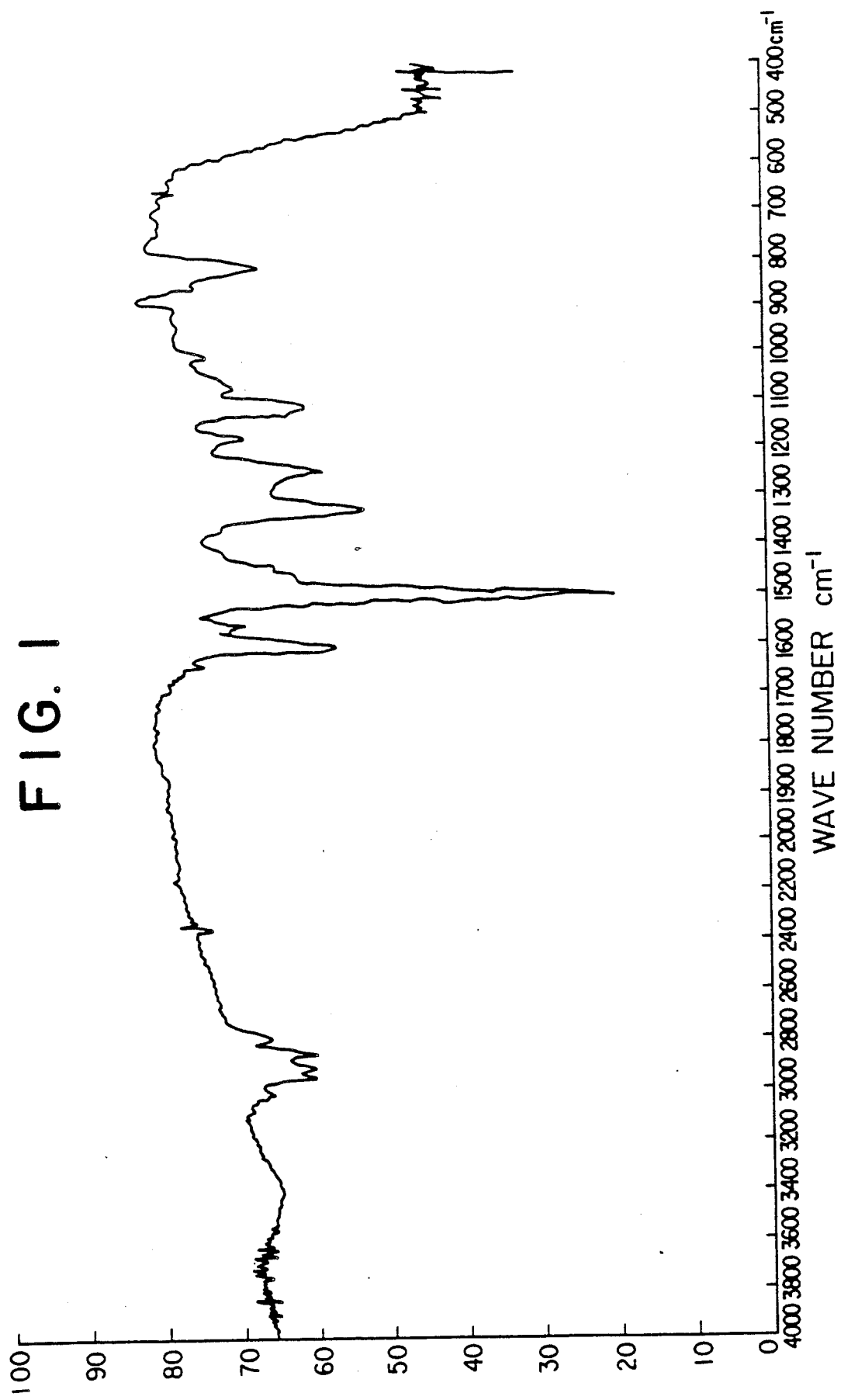
FIG. 1 is an infrared adsorption spectrum diagram of the copolymer obtained in Example 1.
Figure 2:
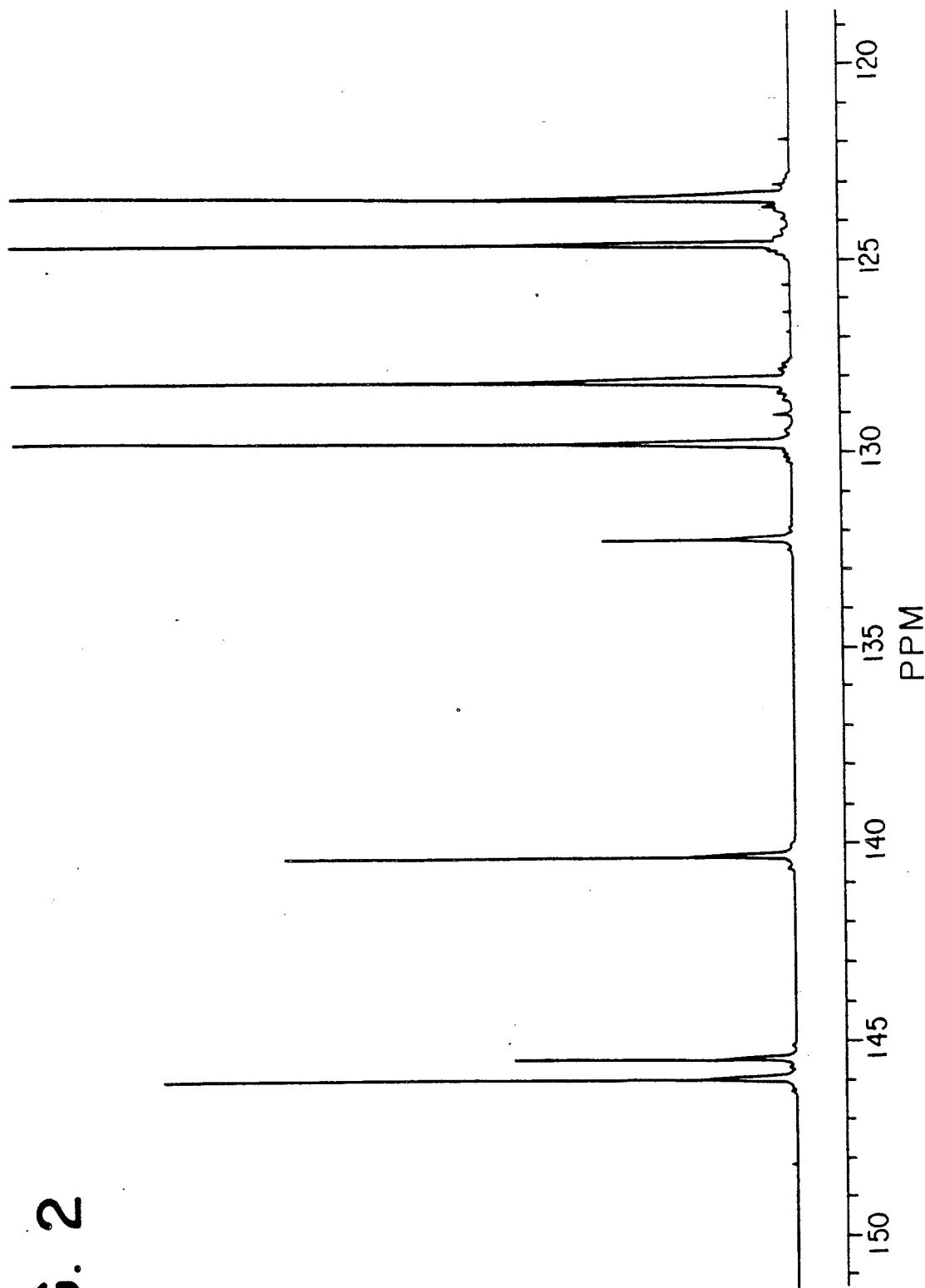
FIG. 2 is a $^{13}$C-NMR spectrum diagram of the copolymer obtained in Example 3.

What is claimed is:

1. A hole transporting material is constituted by a compound represented by the following general formula (1):

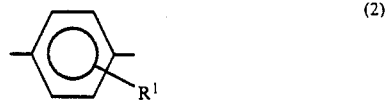

wherein $R^1$, $R^2$, $R^3$, $R^4$ and $R^5$ which may be the same or different, are each independently hydrogen or a hydrocarbon residue having 1 to 20 carbon atoms; $Ar^1$ and $Ar^2$ are each independently a divalent hydrocarbon residue; $\lambda$ is an integer of 0 or more; m is an integer of 1 or more; and n is an integer of 2 or more.

2. A hole transporting material as set forth in claim 1, wherein $R^1$, $R^2$, $R^3$, $R^4$ and $R^5$ are each independently hydrogen, alkyl, aryl, aralkyl, or a derivative thereof; $Ar^1$ and $Ar^2$ are each independently a divalent group represented by the general formula:

or

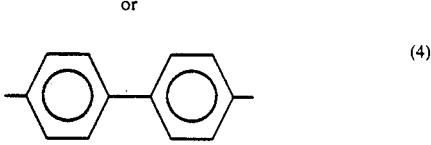

wherein $R^1$ is as defined above.

3. A hole transporting material as set forth in claim 1 or claim 2, wherein $\lambda$ is 1 to 5, m is 1 to 30, and n is 5 to 500.

4. A hole transporting material as set forth in claim 1 or claim 2, wherein $\lambda$ is 0, m is 1, and n is 30 to 1000.

5. A hole transporting material as set forth in claim 1, which is in the form of a thin film.

6. A hole transporting material as set forth in claim 1, wherein the compound represented by the general formula
   (1) is prepared by polycondensation of a compound represented by the following general formula (5) and a compound represented by the following general formula (6):

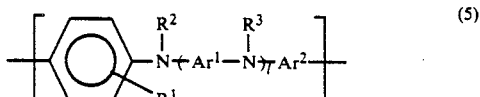

wherein $R^1$, $R^2$, $R^3$, $R^4$, $R^5$, $Ar^1$, $Ar^2$, $\lambda$ and m are as defined claim 1.

7. A photoconductor constituted by a compound represented by the following general formula (1):

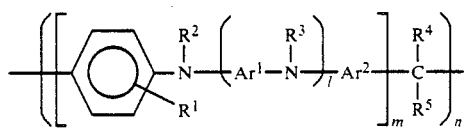

wherein $R^1$, $R^2$, $R^3$, $R^4$ and $R^5$, which may be the same or different, are each independently hydrogen or a hydrocarbon residue having 1 to 20 carbon atoms; $Ar^1$ and $Ar^2$ are each independently a divalent aromatic hydrocarbon residue; $\lambda$ is an integer of 0 or more, m is an integer of 1 or more; and n is an integer of 2 or more.

8. A hole transporting material for an electroluminescent device, constituted by a compound represented by the following general formula (1):

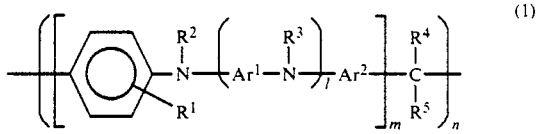

wherein $R^1$, $R^2$, Rhu 3, $R^4$ and $R^5$, be the same or different, are each independently hydrogen or a hydrocarbon residue having 1 to 20 carbon atoms; $Ar^1$ and $Ar^2$ are each independently a divalent aromatic hydrocarbon residue; $\lambda$ is an integer of 0 or more; m is an integer of 1 or more: and n is an integer of 2 or more.

* * * * *

UNITED STATES PATENT AND TRADEMARK OFFICE
CERTIFICATE OF CORRECTION

PATENT NO.  : 5,116,708                                   Page 1 of 2

DATED       : May 26, 1992

INVENTOR(S) : Yutaka Shikatani, et al.

It is certified that error appears in the above-identified patent and that said Letters Patent is hereby corrected as shown below:

Column 2, line 56: "$\lambda$" should read as --$\ell$--

Column 3, lines 4 & 22: "$\lambda$" should read as --$\ell$--

Column 4, line 18: "ethylum-phenylene" should read as --ethyl-m-phenylene--

Column 4, line 26: "atomcontaining" should read as --atom-containing--

Column 4, lines 32, 39 & 57: "$\lambda$" should read as --$\ell$--

Column 5, line 3: "$\leq$" should read as --$\geq$--

Column 5, line 15: "diphenylp-phenylenediamine" should read as --diphenyl-p-phenylenediamine--

Column 8, line 13, Claim 1: "$\lambda$" should read as --$\ell$--

Column 8, line 42, Claim 3: "$\lambda$" should read as --$\ell$--

UNITED STATES PATENT AND TRADEMARK OFFICE
CERTIFICATE OF CORRECTION

PATENT NO. : 5,116,708
DATED : May 26, 1992
INVENTOR(S) : Yutaka Shikatani, et al.

It is certified that error appears in the above-identified patent and that said Letters Patent is hereby corrected as shown below:

Column 8, line 46, Claim 4: "$\lambda$" should read as -- $\ell$ --

Column 8, line 65, Claim 6: "$\lambda$" should read as -- $\ell$ --

Column 9, line 16, Claim 7: "$\lambda$" should read as -- $\ell$ --

Column 10, line 11, Claim 8: "rhu3" should read as --$R^3$--

Column 10, line 11, Claim 8: after "$R^5$" insert --which may--

Column 10, line 16, Claim 8: "$\lambda$" should read as -- $\ell$ --

Signed and Sealed this

Fourteenth Day of September, 1993

Attest:

BRUCE LEHMAN

*Attesting Officer*   *Commissioner of Patents and Trademarks*